United States Patent [19]

Matoushek et al.

[11] Patent Number: 5,009,509

[45] Date of Patent: Apr. 23, 1991

[54] CLAMPING APPARATUS FOR THERMAL TRANSFER PRINTER

[75] Inventors: Robert J. Matoushek; Terrence L. Fisher, both of Rochester; James A. Whritenor, Spencerport, all of N.Y.

[73] Assignee: Eastman Kodak Company, Rochester, N.Y.

[21] Appl. No.: 457,039

[22] Filed: Dec. 26, 1989

[51] Int. Cl.[5] .......... G01D 15/28; B65H 5/02

[52] U.S. Cl. .......... 346/138; 346/103; 346/125; 346/76 PH; 271/275; 271/277

[58] Field of Search .......... 346/103, 125, 138, 76 PH; 271/275, 277; 400/120

[56] References Cited

U.S. PATENT DOCUMENTS

| | | | |
|---|---|---|---|
| 4,390,176 | 6/1983 | Kato | 346/138 |
| 4,745,413 | 5/1988 | Brownstein et al. | 346/76 PH |
| 4,815,870 | 3/1989 | Sparer et al. | 400/120 |

FOREIGN PATENT DOCUMENTS

| | | | |
|---|---|---|---|
| 0062475 | 5/1981 | Japan | 271/277 |
| 0140952 | 6/1987 | Japan | 271/277 |

*Primary Examiner*—Benjamin R. Fuller
*Assistant Examiner*—Huan Tran
*Attorney, Agent, or Firm*—John D. Husser

[57] ABSTRACT

Apparatus for clamping receiver sheets to the print drum of a thermal transfer printer. The apparatus includes a clamp assembly mounted for radial movement and having a clamp strip extending over the drum periphery and an interior longitudinal body coupled to that strip at a plurality of axially spaced locations. A longitudinal lever member extends axially within the drum from a pivot point at one drum end to an actuation arm at the other drum end and has a pivot arm coupled to a central portion of the clamp body. Springs urge the clamp assembly radially inwardly and an actuator mounted on the other drum end selectively moves the lever member radially outwardly.

2 Claims, 3 Drawing Sheets

CLAMPING APPARATUS FOR THERMAL TRANSFER PRINTER

Field of Invention

The present invention relates to thermal printers of the kind where dye is imagewise transferred from donor web sections to receiver sheets and, more specifically, to improved apparatus for clamping receiver sheets to a print drum in such printers.

BACKGROUND OF INVENTION

In thermal transfer printing successive sections of a donor sheet or web are fed through a linear printing region where they move, in contact with successive lines of a receiver, past a thermal print head comprising a linear array of selectively energizable, pixel-size heater elements. The print head or other means urge the juxtaposed donor and receiver sections into intimate contact at the print zone so that dye is transferred from the donor to the receiver in the pixels beneath energized heaters of the array. In multicolor thermal printing the receiver is moved through the printing zone a plurality of times so that a plurality of different color image components (e.g. cyan, magenta and yellow) can be successively printed on the donor, in register.

One common configuration for effecting such multicolor printing is described in U.S. Pat. No. 4,745,413, wherein the donor sheet is clamped onto the periphery of a print drum which rotates successive line portions past a linear thermal print array. A web bearing successive donor sections of yellow, magenta and cyan dye is fed through the print zone, between the print array and receiver, in a timed relation so that a different color donor section moves through the print zone with the receiver, respectively during each of the print drum rotations.

In typical prior art thermal transfer printers, the clamping apparatus provided on a print drum performs several functions. First, it must open precisely so that new receiver sheets can be reliably fed into engagable position and printed sheets can be reliably removed. Desirably it provides an accurate system for properly aligning the receiver sheet vis a vis the printing system. And, it must hold the sheet firmly in its aligned position during printing rotations of the drum past the print head.

In such clamping apparatus, different constructional approaches provide clamp actuator mechanisms on one end or on both ends of the print drum, which cooperate with abutment structures to open the sheet clamp via drum rotation. The simpler, less expensive approach is to provide actuators on one end only; however, this can result in an uneven width to the open clamp mouth (narrower at the end away from the actuator). The actuator-at-both-ends approach can eliminate the non-uniform gap opening but such construction are more costly from the parts viewpoint and require accurate alignments of the two end actuators during the print drum assembly.

SUMMARY OF INVENTION

One significant purpose of the present invention is to provide an improved clamping apparatus which performs the necessary functions outlined above, but avoids the disadvantages of prior art devices.

In one aspect the invention constitutes improved clamping apparatus for a thermal transfer printer of the kind having a rotatably mounted print drum for supporting a receiver sheet for movement past a thermal print station. The improved clamping apparatus includes: a clamp assembly mounted for movement radially on the drum and having a clamp plate extending over a longitudinal strip of the drum periphery and an interior longitudinal body coupled to the plate at a plurality of axially spaced locations. A longitudinal lever member extends axially within the drum from a pivot point at one drum end to an actuation arm at the other drum end and has a central pivot arm coupled to a central portion of the clamp assembly body. Spring means urge the clamp assembly radially inwardly and actuator means are provided on the other drum end for selectively moving the lever member radially outwardly.

BRIEF DESCRIPTION OF DRAWINGS

The subsequent description of preferred embodiments refers to the accompanying drawings wherein.

DETAILED DESCRIPTION OF PREFERRED EMBODIMENTS

Figure 1:
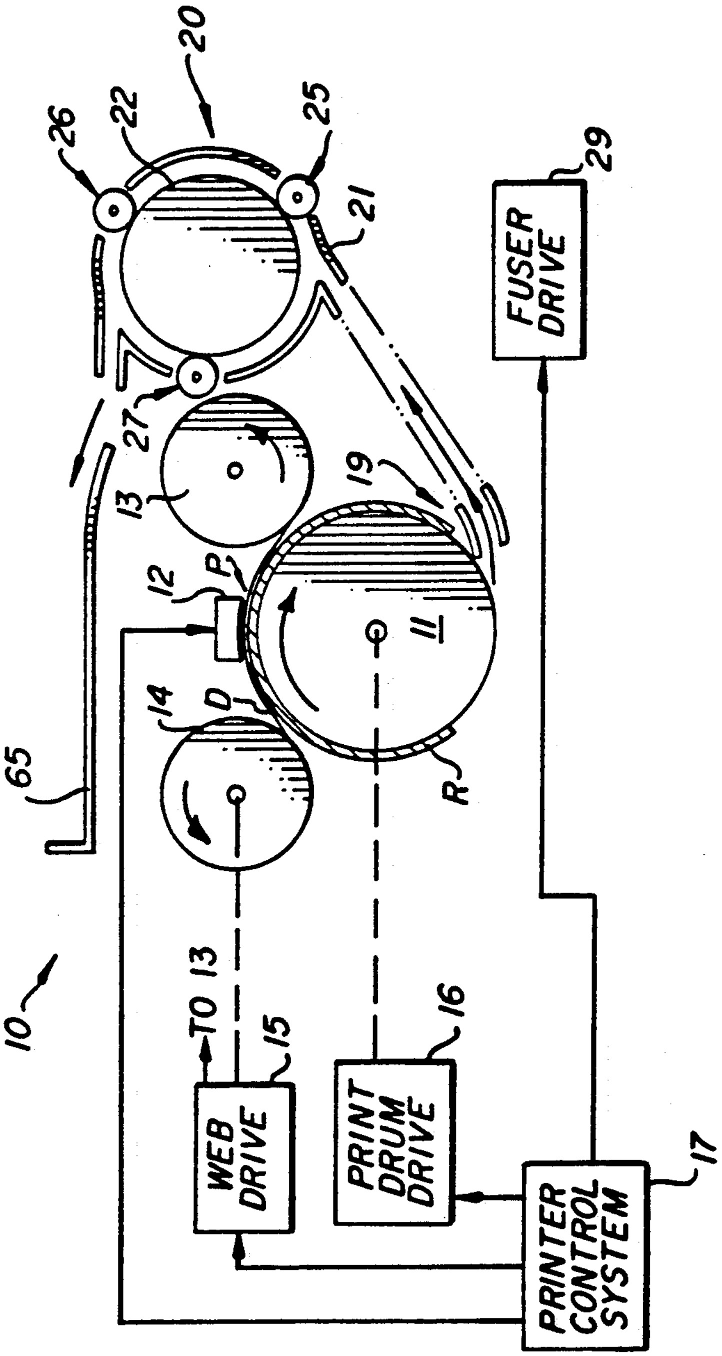
FIG. 1 a schematic illustration of one thermal transfer in which the present invention is useful.

A thermal transfer printer 10 which can incorporate a preferred embodiment of clamping apparatus, according to the present invention, is shown schematically in FIG. 1. The printer 10 comprises, in general, a cylindrical print drum 11 for clamping, supporting and rotating a receiver R through a print zone P, opposite thermal print head array 12. A donor web D bearing thermally transferable cyan, magenta and yellow dye sections (C, Y, M) in repeating series, is fed through the print zone P, (between the receiver R clamped on the print drum and the print head 12) from a supply spool 14 to take up spool 13 by a drive system 15 coupled to the take up spool. The print drum drive 16 and the donor web drive 15 are controlled by printer control 17 and the donor web drive is constructed to allow the donor to be transported through the print region by the print drum. The print head also is synchronized with the print drum by printer control 17 so that, as the receiver sheet R is rotated three passes through the print zone, different color separation image portions are printed from the sections CMY, in register onto its face.

After completion of three passes with drum rotation clockwise as shown in FIG. 1, the drum is rotated counter clockwise to unlatch the receiver R and feed an end of the receiver through the outlet guide passage 19 toward the fuser station 20. Thus, the print drum 11 is constructed to support and hold a receiver R during successive rotations past the print P and thereafter to release the receiver for feed to the fuser station 20.

Figures 2, 2A, 2B:
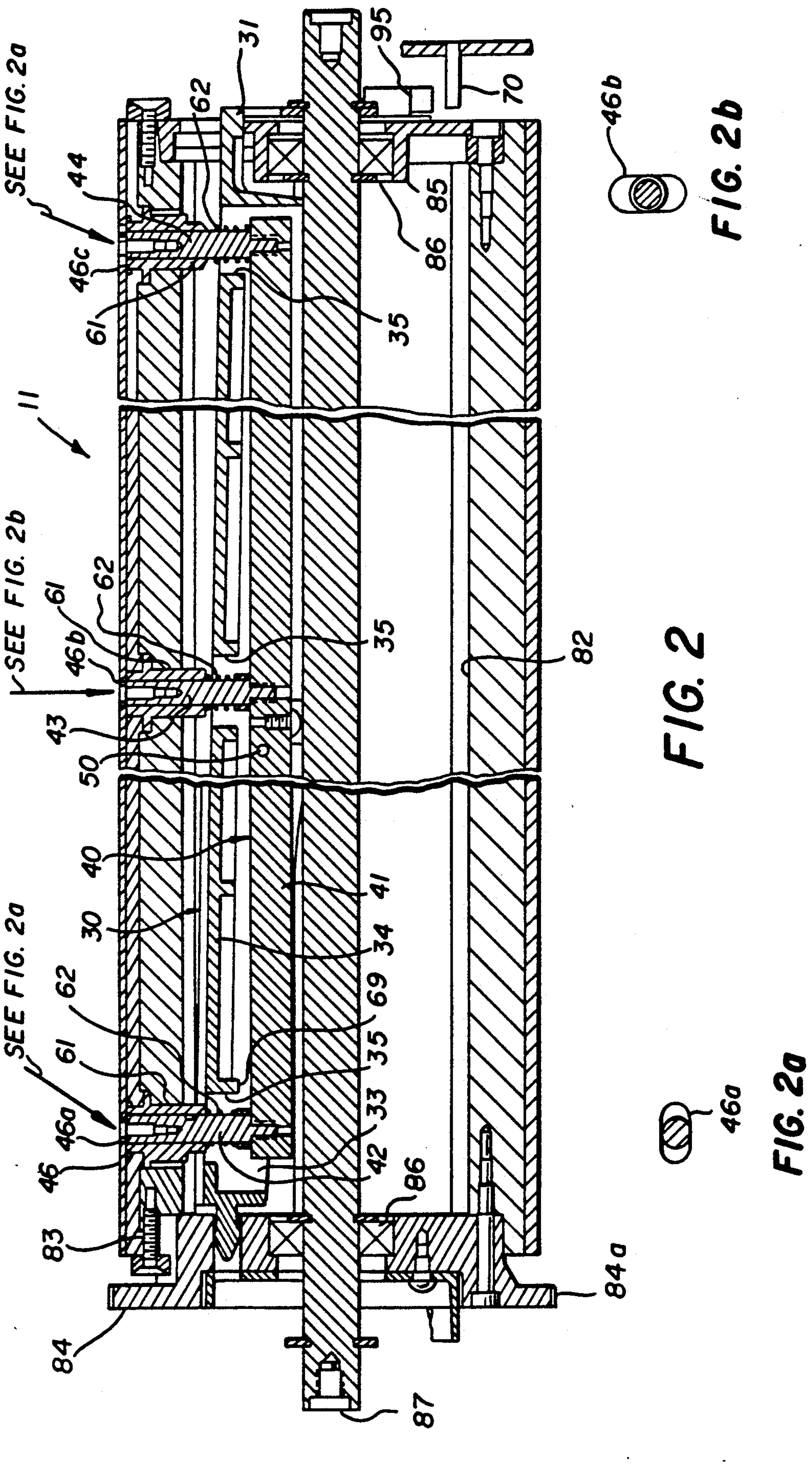
FIG. 2 is a longitudinal cross section of a print drum such as shown in FIG. 1 incorporating one preferred receiver clamping apparatus in accord with the present invention.
FIGS. 2*a* and 2*b* show, respectively, an axial end slot and a central slot through which a clamp plate is attached to a clamp body in the interior of a drum body; and shown in FIG. 2.
Figure 3:
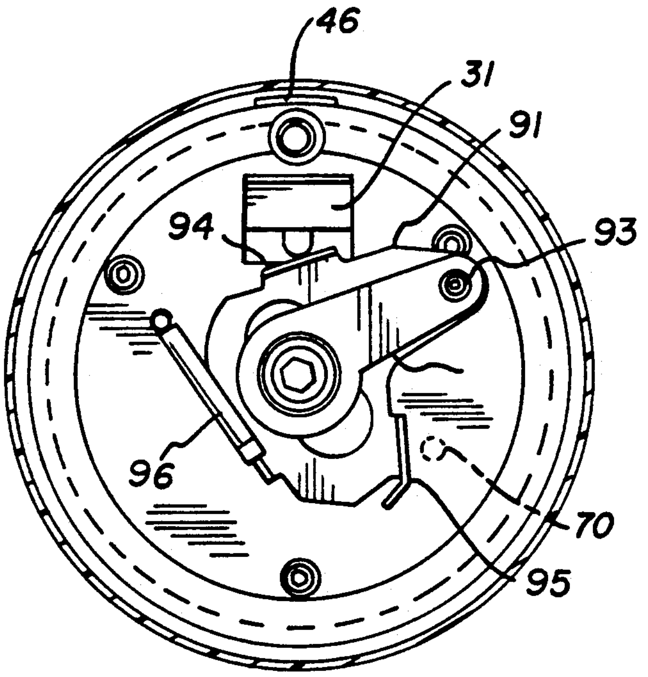
FIG. 3 an end view of the print drum

Details of a print drum 11, incorporating one preferred receiver clamping apparatus in accord with the present invention, are shown in FIGS. 2 and 3. The print drum housing comprises a cylindrical shell 82 having an outer cover layer 83 and two end caps 84, 85 including bearings 86 that mount the entire drum housing for rotation on shaft 87. End cap 84 has a gear toothed periphery 84a for coupling with the print drum drive train (not shown).

The receiver clamping and release apparatus of the print drum comprises, in general, a control assembly 90, an actuator lever assembly 30, a clamp assembly 40, and shell and end cap constructions, which support those assemblies in proper functioning interrelations. Thus, control assembly 90 includes an L-shaped control arm 91 mounted on end cap 85 for movement about a pivot 93 at one leg end and having a follower tab 94 and an actuator tab 95. Spring 96 urges the arm 91 so that follower tab rests against actuator end 31 of assembly 30, which extends through an opening in the end cap 85.

The other, pivot end 32 of actuator assembly 30 has a spherical-like configuration and is located in an axial bore of end cap 84. Between its ends, actuator assembly 30 comprises an axially extending body that has a flange portions 33 and a top portion 34, with openings 35 to accommodate portions of the clamp assembly as described below.

The clamp assembly 40 comprises an axially elongated body portion 41 with three pin arms 42, 43, 44, which extend radially through sleeve elements 61 mounted on the drum 12. Coil springs 62 are located between the ends of sleeve elements 61 and the body 41 of the clamp assembly 40 and urge the entire clamp assembly downwardly (as viewed in FIG. 1) to the clamp closed condition. The clamp plate 46 is attached to the top of arms 42, 43, 44 by fasteners that extend through two axial end slots 46-a and 46-c and a circumferential central slot 46-b. See FIGS. 2, 2(*a*) and 2(*b*) of center pin arm 43 is relieved to prevent contact with the receiver and allow end pins 42, 44 to control receiver end alignment. The slot construction prevents binding of the pins but still maintains receiver alignment features of the end pins.

An axle pin 50 couples the flange portion 33 of the actuator assembly 30 to the body portion 41 of clamp assembly 40 at a longitudinally off-centered position (closer to the pivot end 32 of the actuator assembly). Thus, in operation upward movement of the actuator assembly 30 (i.e. lifting the lever end 31 to pivot the assembly at end 32) also lifts the clamp assembly 40 (via the coupling axle pin 50).

In operation of the printer system, receiver sheets are fed from a supply station (not shown) to a print drum ingress position as described in U.S. Pat. No. 4,745,713. When it is desired to insert a new receiver sheet end and/or release a printed receiver sheet end for fusing, control system 17 signals for print drum drive to rotate the drum 11 counter-clockwise. Such counterclockwise rotation causes an engagement between fixed pin 70 and tab 95 so that tab 95 forces arm 91 to rotate in a clockwise direction about its pivot 93. This causes tab 94 to lift actuator end 31 of assembly 30, which in turn effects the operation of the lifting of assembly 40 as described above. The new receiver sheet is then fed into abutment with pin arms 42, 44. The drum 11 is next rotated clockwise (or control pin 70 retracted) to allow springs 62 to move clamp plate 46 down to retain the inserted sheet end. During printing rotations in the clockwise direction, tab 95 is constructed and located to contact pin 70 in a manner such that it pivots arm 91 away from actuator 31 and does not open the clamp apparatus.

Several unique and advantageous functional features should be noted about the clamping apparatus embodiment just described. First, the lifting of assembly 30 at one end about a pivot at the other end, with its off center coupling 50 to the clamp assembly 40, allows the clamp plate 46 to be opened with a uniform spacing for sheet insertion. This avoids the complexity of constructing and aligning actuators at both drum ends. Second, the off-center pivot point at coupling 50 insures that one end (the left end as viewed in FIG. 2) will always open first to its stop position (defined by the contact between bottom post surface 69 and lever body 41) before the other right end opens fully. This insures total clamp plate opening without a close tolerance actuator and prevents damage due to over opening of the clamping apparatus.

Other structural features of the apparatus provide assembly and reliability advantages. Thus, the axial end slots and circumferential central slot, provided to couple clamp plate 46 to pin arms 42, 43, 44, reduce fabrication tolerances, but assure that once assembled, the plate 46 cannot shift axially or about an axis perpendicular to the drum surface. The receiver sheet indexing portions are therefore maintained in proper alignment. Also, the three individually loaded springs distribute clamping force and enable a flexible (low tolerance) clamp plate adjustment.

The invention has been described in detail with particular reference to certain preferred embodiments thereof, but it will be understood that variations and modifications can be effected within the spirit and scope of the invention.

We claim:

1. In a thermal transfer printer of the kind having a rotatably mounted print drum for supporting receiver sheets for movement past a thermal print station, improved apparatus for clamping such receiver sheets comprising:

(a) actuator means mounted on one end of said drum for movement between clamping and unclamping positions;

(b) lever means pivotally mounted at the other end of said drum and having a longitudinal body extending axially within said drum interior to a follower end in actuatable relation to said actuator means;

(c) clamping means having:

(i) an elongated portion extending axially within said drum in generally opposing relation to said longitudinal body of said lever means;

(ii) a plurality of axially spaced arms extending radially from said body to said drum periphery; and (iii) a clamp member coupled to said arms and extending axially over a longitudinal section of said drum periphery; and (d) means for pivotally coupling said elongated portion of said clamping means to a region of said lever means that is between said drum ends.

2. In a thermal transfer printer of the kind having rotatably mounted print drum for supporting a receiver sheet for movement past a thermal print station, improved apparatus for clamping such receiver sheets comprising:

(a) a clamp assembly mounted for radial movement and having a clamp strip extending over a longitudinal strip of said drum periphery and an interior longitudinal body coupled to said strip at a plurality of axially spaced locations;

(b) a longitudinal lever member extending axially within said drum from a pivot point at one drum end to an actuation arm at the other end of said drum and having a central pivot arm coupled to a central portion of said clamp body;

(c) spring means for urging said clamp assembly radially inwardly; and (d) actuator means mounted on said other end of said drum for selectively moving said lever member radially outwardly.

* * * * *